US012361857B2

(12) United States Patent
Noh

(10) Patent No.: US 12,361,857 B2
(45) Date of Patent: Jul. 15, 2025

(54) DISPLAY DEVICE HAVING IMPROVED RESPONSE PROPERTY AND METHOD OF DRIVING THE SAME

(71) Applicant: LG DISPLAY CO., LTD., Seoul (KR)

(72) Inventor: Jun-Hwan Noh, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/424,951

(22) Filed: Jan. 29, 2024

(65) Prior Publication Data

US 2024/0257696 A1 Aug. 1, 2024

(30) Foreign Application Priority Data

Jan. 31, 2023 (KR) ........................ 10-2023-0012437

(51) Int. Cl.

*G09G 3/20* (2006.01)
*G09G 3/3233* (2016.01)
*G09G 3/3266* (2016.01)

(52) U.S. Cl.

CPC ......... *G09G 3/2092* (2013.01); *G09G 3/2007* (2013.01); *G09G 3/3233* (2013.01); *G09G 3/3266* (2013.01); *G09G 2300/0819* (2013.01); *G09G 2300/0842* (2013.01); *G09G 2300/0861* (2013.01); *G09G 2340/0435* (2013.01); *G09G 2354/00* (2013.01)

(58) Field of Classification Search

CPC .. G09G 3/2092; G09G 3/2007; G09G 3/3233; G09G 3/3266; G09G 2300/0819; G09G 2300/0842; G09G 2300/0861; G09G 2340/0435; G09G 2354/00; G09G 3/3225; G09G 3/2074; G09G 3/30; G09G 3/3648; G09G 3/3677; G09G 3/3208; G09G 2310/0267; G09G 2320/0247; G09G 2320/0252; G09G 2330/021; H10D 30/6755

See application file for complete search history.

(56) References Cited

U.S. PATENT DOCUMENTS 8,238,968 B1 * 8/2012 Frydman ............. H04W 52/027 348/602
10,636,356 B1 * 4/2020 Qian .................... G09G 3/3233
11,176,876 B1 * 11/2021 Lee .......................... G09G 3/32
2008/0319562 A1 * 12/2008 Forstall .................. G09G 5/006 700/94
2009/0174629 A1 * 7/2009 Lee ...................... G09G 3/3225 345/76

(Continued)

FOREIGN PATENT DOCUMENTS

KR 10-2022-0095902 A 7/2022

*Primary Examiner* — Jose R Soto Lopez
(74) *Attorney, Agent, or Firm* — Fish & Richardson P.C.

(57) ABSTRACT

A display device includes a timing controlling unit generating an image data, a data control signal and a gate control signal; a data driving unit generating a data signal using the image data and the data control signal; a gate driving unit generating a gate signal using the gate control signal; and a display panel displaying an image using the data signal and the gate signal, wherein the timing controlling unit includes a frequency modulating part configured to increase a frequency of the data signal when an event to the display panel occurs and decrease the frequency after a predetermined interval.

21 Claims, 9 Drawing Sheets

(56) References Cited

U.S. PATENT DOCUMENTS

2011/0044441 A1* 2/2011 Gancarcik ............ G09G 3/3614 379/93.05
2012/0009930 A1* 1/2012 Brisebois .............. H04W 76/28 455/450
2012/0069059 A1* 3/2012 Lee ...................... G09G 3/3225 345/76
2012/0161637 A1* 6/2012 Lee .......................... G09G 3/32 315/122
2012/0191993 A1* 7/2012 Drader .................... G06F 3/041 713/320
2012/0284552 A1* 11/2012 Archer, Jr. ............ G06F 1/3203 713/324
2013/0023258 A1* 1/2013 Choi ................. H04M 1/72412 455/418
2014/0111500 A1* 4/2014 Kasuga .................... G09G 5/00 345/212
2014/0184578 A1* 7/2014 Lee ...................... G09G 3/3225 345/82
2015/0042668 A1* 2/2015 Jeon ...................... G06F 1/3265 345/534
2015/0123963 A1* 5/2015 Tsai ..................... G09G 3/2096 345/213
2016/0188142 A1* 6/2016 Oh ........................ G06F 1/3265 345/87
2017/0091512 A1* 3/2017 Kumano ................ G09G 5/003
2017/0123589 A1* 5/2017 Moon .................... G09G 5/399
2017/0186399 A1* 6/2017 Moritani ................ G09G 5/003
2017/0337877 A1* 11/2017 Kim ..................... G09G 3/3225
2018/0040301 A1* 2/2018 Bae ........................ G09G 5/363
2018/0204303 A1* 7/2018 Bae ........................... G06T 1/60
2018/0212060 A1* 7/2018 Kang ...................... H10F 30/21
2018/0261163 A1* 9/2018 Hyun ..................... G09G 3/003
2018/0284967 A1* 10/2018 Lee ....................... G06F 3/1454
2018/0373317 A1* 12/2018 Ying ........................ G09G 5/00
2018/0373913 A1* 12/2018 Panchawagh ...... G06V 40/1306
2019/0237042 A1* 8/2019 Hu ......................... G09G 5/008
2019/0244560 A1* 8/2019 Lee ....................... G06F 1/1686
2019/0306611 A1* 10/2019 McCollum Bechert ..................... A44C 15/0015
2019/0342447 A1* 11/2019 Ko .................... H04M 1/72472
2020/0050427 A1* 2/2020 Althaus ................... G06F 3/167
2020/0089302 A1* 3/2020 Kim ...................... G06F 1/3265
2020/0193936 A1* 6/2020 Fu ......................... G06F 1/1684
2020/0226978 A1* 7/2020 Lin .................... H10K 59/1213
2020/0294450 A1* 9/2020 Kim ..................... G09G 3/3266
2020/0320917 A1* 10/2020 Han ......................... G09G 3/20
2020/0320958 A1* 10/2020 Sinha ..................... G09G 5/006
2020/0384190 A1* 12/2020 Jacobi ................. G06F 3/04842
2021/0303229 A1* 9/2021 Otani .................... G06F 3/1208
2021/0326564 A1* 10/2021 Yao ..................... G06F 3/03547
2022/0019332 A1* 1/2022 Ko .......................... G06F 1/324
2022/0366835 A1* 11/2022 Park ..................... G09G 3/3233
2023/0032883 A1* 2/2023 Park ..................... G09G 3/3241
2023/0206854 A1* 6/2023 Kim ..................... G09G 3/3266 345/699
2023/0280875 A1* 9/2023 Kim .................... G06F 3/04886 715/788
2024/0096283 A1* 3/2024 Lim ..................... G09G 3/3233
2024/0134582 A1* 4/2024 Oka ...................... G06F 3/1236
2024/0144857 A1* 5/2024 Shin ......................... G09G 3/32
2024/0161704 A1* 5/2024 Kim ..................... G09G 3/3266
2024/0203346 A1* 6/2024 Nam .................... G09G 3/3233

* cited by examiner

DISPLAY DEVICE HAVING IMPROVED RESPONSE PROPERTY AND METHOD OF DRIVING THE SAME

CROSS-REFERENCE TO RELATED APPLICATION

The present application claims the priority of Korean Patent Application No. 10-2023-0012437, filed on Jan. 31, 2023, which is hereby incorporated by in its entirety.

BACKGROUND

Field of the Disclosure

The present disclosure relates to a display device, and more particularly, to a display device where a response property is improved in a low frequency operation by inserting a high frequency period.

Description of the Background

Recently, with the advent of an information-oriented society, the interest in information displays for processing and displaying a massive amount of information and the demand for portable information media have increased. As such, a display field has rapidly advanced. Thus, various light and thin flat panel display devices have been developed and highlighted.

Among the various flat panel display devices, an organic light emitting diode (OLED) display device is an emissive type device that does not include a backlight unit used in a non-emissive type device such as a liquid crystal display (LCD) device. As a result, the OLED display device has advantages in a viewing angle, a contrast ratio and a power consumption to be applied to various fields.

The OLED display device displays an image by changing a frequency (refresh rate) according to a mode. For example, the OLED display device may display an image with about 60 Hz in a real use mode and with about 1 Hz in a standby mode.

When the OLED display device is driven with a relatively low frequency, a single frame (1F) is classified into a refresh subframe where a gate signal and a data signal are generated and inputted and an anode reset subframe where generation and input of a gate signal and a data signal are stopped.

When a gray level of an image displayed by the OLED display device is rapidly changed, a luminance of a first subframe may not reach a target luminance due to a hysteresis of a driving transistor.

Specifically, when the OLED display device is driven with a relatively low frequency, a data signal is inputted during a refresh subframe of a first subframe. As a result, a time for the target luminance is further delayed and a response property is deteriorated. In addition, a display quality is deteriorated due to a defect such as a flicker or a motion blur.

SUMMARY

Accordingly, the present disclosure is directed to a display device that substantially obviates one or more of the problems due to limitations and disadvantages of the related art.

More specifically, the present disclosure is to provide a display device where a response property and a display quality are improved by inserting a high frequency period in case of an event of a low frequency driving.

Further, the present disclosure is to provide a display device where a response property and a display quality are improved and a power consumption is reduced by inserting a high frequency period in case of an event of a low frequency driving and returning to the low frequency driving in case of no additional event.

Additional features and advantages of the disclosure will be set forth in the description which follows, and in part will be apparent from the description, or may be learned by practice of the disclosure. These and other advantages of the disclosure will be realized and attained by the structure particularly pointed out in the written description and claims hereof as well as the appended drawings.

To achieve these and other advantages and in accordance with the purpose of the present disclosure, as embodied and broadly described herein, a display device includes a timing controlling unit generating an image data, a data control signal and a gate control signal; a data driving unit generating a data signal using the image data and the data control signal; a gate driving unit generating a gate signal using the gate control signal; and a display panel displaying an image using the data signal and the gate signal, wherein the timing controlling unit includes a frequency modulating part configured to increase a frequency of the data signal when an event to the display panel occurs and decrease the frequency after a predetermined interval.

In another aspect of the present disclosure, a method of driving a display device includes: generating an image data, a data control signal and a gate control signal by a timing controlling unit; generating a data signal using the image data and the data control signal by a data driving unit; generating a gate signal using the gate control signal by a gate driving unit; displaying an image using the data signal and the gate signal by a display panel; increasing a frequency of the data signal when an event to the display panel occurs by the timing controlling unit; and decreasing the frequency after a predetermined interval by the timing controlling unit.

It is to be understood that both the foregoing general description and the following detailed description are explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this specification, illustrate aspects of the disclosure and together with the description serve to explain the principles of the disclosure.

In the drawings.

DETAILED DESCRIPTION

Figure 1:
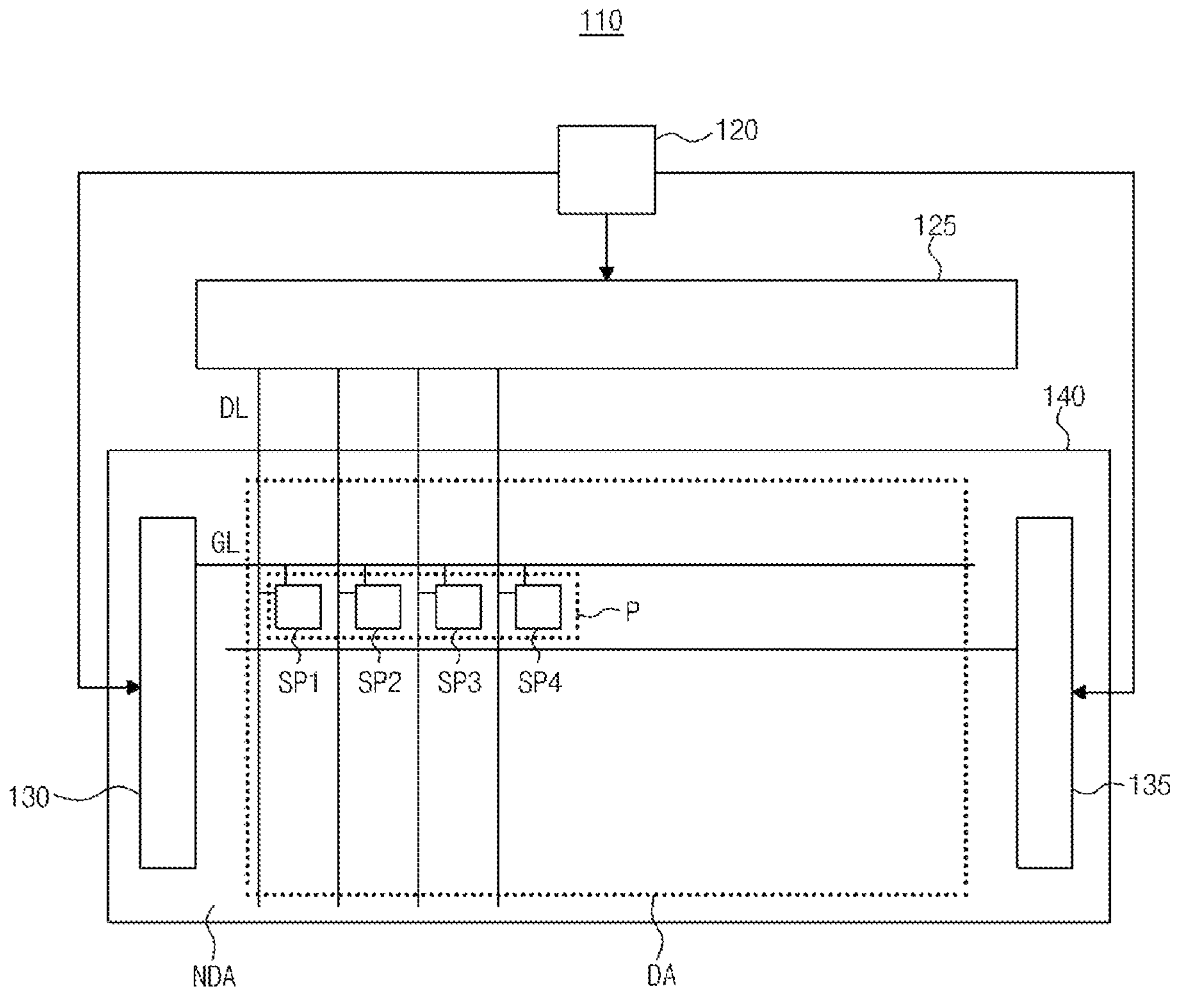
FIG. 1 is a view showing a display device according to an aspect of the present disclosure.

Advantages and features of the present disclosure, and implementation methods thereof will be clarified through following example aspects described with reference to the accompanying drawings. The present disclosure may, however, be embodied in different forms and should not be construed as limited to the example aspects set forth herein. Rather, these example aspects are provided so that this disclosure may be sufficiently thorough and complete to assist those skilled in the art to fully understand the scope of the present disclosure. Further, the present disclosure is only defined by scopes of claims.

The shapes, sizes, ratios, angles, numbers, and the like, which are illustrated in the drawings to describe various example aspects of the present disclosure, are merely given by way of example. Therefore, the present disclosure is not limited to the illustrations in the drawings. Like reference numerals refer to like elements throughout the specification, unless otherwise specified.

In the following description, where the detailed description of the relevant known function or configuration may unnecessarily obscure a feature or aspect of the present disclosure, a detailed description of such known function or configuration may be omitted or a brief description may be provided.

Where the terms "comprise," "have," "include," and the like are used, one or more other elements may be added unless the term, such as "only," is used. An element described in the singular form is intended to include a plurality of elements, and vice versa, unless the context clearly indicates otherwise.

In construing an element, the element is to be construed as including an error or a tolerance range even where no explicit description of such an error or tolerance range is provided.

Where positional relationships are described, for example, where the positional relationship between two parts is described using "on," "over," "under," "above," "below," "beside," "next," or the like, one or more other parts may be located between the two parts unless a more limiting term, such as "immediate(ly)," "direct(ly)," or "close(ly)" is used. For example, where an element or layer is disposed "on" another element or layer, a third layer or element may be interposed therebetween.

Although the terms "first," "second," A, B, (a), (b), and the like may be used herein to refer to various elements, these elements should not be interpreted to be limited by these terms as they are not used to define a particular order or precedence. These terms are only used to distinguish one element from another. For example, a first element could be termed a second element, and, similarly, a second element could be termed a first element, without departing from the scope of the present disclosure.

The term "at least one" should be understood to include all combinations of one or more of related elements. For example, the term of "at least one of first, second and third elements" may include all combinations of two or more of the first, second and third elements as well as the first, second or third element.

The term "display device" may include a display device in a narrow sense such as liquid crystal module (LCM), an organic light emitting diode (OLED) module and a quantum dot (QD) module including a display panel and a driving unit for driving the display panel. In addition, the term "display device" may include a complete product (or a final product) including the LCM, the OLED module and the QD module such as a notebook computer, a television, a computer monitor, an equipment display device including an automotive display apparatus or a shape other than a vehicle, and a set electronic apparatus or a set device (or a set apparatus) such as a mobile electronic apparatus of a smart phone or an electronic pad.

Accordingly, a display device of the present disclosure may include an applied product or a set device of a final user's device including the LCM, the OLED module and the QD module as well as a display device in a narrow sense such as the LCM, the OLED module and the QD module.

According to circumstances, the LCM, the OLED module and the QD module having a display panel and a driving unit may be expressed as "a display device", and an electronic apparatus of a complete product including the LCM, the OLED module and the QD module may be expressed as "a set device." For example, a display device in a narrow sense may include a display panel of a liquid crystal, an organic light emitting diode and a quantum dot and a source printed circuit board (PCB) of a control unit for driving the display panel, and a set device may further include a set PCB of a set control unit electrically connected to the source PCB for controlling the entire set device.

The display panel of the present disclosure may include all kinds of display panels such as a liquid crystal display panel, an organic light emitting diode display panel, a quantum dot display panel and an electroluminescent display panel. The display panel of the present disclosure is not limited to a specific display panel of a bezel bending having a flexible substrate for an organic light emitting diode display panel and a lower back plate supporter. A shape or a size of the display panel for the display device of the present disclosure is not limited thereto.

For example, when the display panel is an organic light emitting diode display panel, the display panel may include a plurality of gate lines, a plurality of data lines and a subpixel in a crossing region of the plurality of gate lines and the plurality of data lines. The display panel may include an array having a thin film transistor of an element for selectively applying a voltage to each subpixel, an emitting element layer on the array and an encapsulating substrate or an encapsulation part covering the emitting element layer. The encapsulation part may protect the thin film transistor and the emitting element layer from an external impact and may prevent or at least reduce penetration of a moisture or oxygen into the emitting element layer. In addition, a layer on the array may include an inorganic light emitting layer, for example, a nano-sized material layer or a quantum dot.

The thin film transistor of the present disclosure may include one of an oxide thin film transistor, an amorphous silicon thin film transistor, a low temperature polycrystalline silicon thin film transistor.

Features of various aspects of the present disclosure may be partially or entirely coupled to or combined with each other. They may be linked and operated technically in various ways as those skilled in the art may sufficiently understand. The aspects may be carried out independently of or in association with each other in various combinations.

Hereinafter, a display device according to various example aspects of the present disclosure where an influence on an oxide semiconductor layer of a thin film transistor of a driving element part is reduced by shielding a light emitted and transmitted from a subpixel and/or a light inputted from an exterior will be described in detail with reference to the accompanying drawings.

FIG. 1 is a view showing a display device according to an aspect of the present disclosure. The display device may be an organic light emitting diode (OLED) display device.

In FIG. 1, a display device 110 according to an aspect of the present disclosure includes a timing controlling unit 120, a data driving unit 125, first and second gate driving units 130 and 135 and a display panel 140.

The timing controlling unit 120 generates an image data, a data control signal and a gate control signal using an image signal and a plurality of timing signals including a data enable signal, a horizontal synchronization signal, a vertical synchronization signal and a clock signal transmitted from an external system such as a graphic card or a television system. The image data and the data control signal are transmitted to the data driving unit 125, and the gate control signal is transmitted to the first and second gate driving units 130 and 135.

The timing controlling unit 120 may include a monitoring part 150 (of FIG. 5) judging whether an event occurs or not by detecting a change of an event signal Eve (of FIG. 5) using a monitoring signal Mon (of FIG. 5) and a frequency modulating part 152 (of FIG. 5) increasing a frequency in case of an event and decreasing the frequency after a predetermined period (e.g., a single frame of about 1 second). The frequency is an input frequency of a data signal Vdata (of FIG. 4) with respect to the display panel 140.

The data driving unit 125 generates a data signal (a data voltage) Vdata using the data control signal and the image data transmitted from the timing controlling unit 120 and transmits the data signal to a data line DL of the display panel 140.

The first and second gate driving units 130 and 135 generate a gate signal (a gate voltage) Sc1, Sc2*o*, Sc2*e*, Sc3 and Sc4 (of FIG. 4) and an emission signal (an emission voltage) Em (of FIG. 4) using the gate control signal transmitted from the timing controlling unit 120 and applies the gate signal Sc1, Sc2*o*, Sc2*e*, Sc3 and Sc4 and the emission signal Em to a gate line GL of the display panel 140.

The first and second gate driving units 130 and 135 may have a gate in panel (GIP) type to be formed in a non-display area NDA of a substrate of the display panel 140 having the gate line GL, the data line DL and a pixel P.

Although the first and second gate driving units 130 and 135 are disposed in both side portions of the display panel 140 in the aspect of FIG. 1, one gate driving unit may be disposed in one side portion of the display panel 140 in another aspect.

The display panel 140 includes a display area DA at a central portion thereof and a non-display area NDA surrounding the display area DA. The display panel 140 displays an image using the gate signal Sc1, Sc2*o*, Sc2*e*, Sc3 and Sc4, the emission signal Em and the data signal Vdata. For displaying an image, the display panel 140 includes a plurality of pixels P, a plurality of gate lines GL and a plurality of data lines DL in the display area DA.

Each of the plurality of pixels P includes first to fourth subpixels SP1 to SP4, and the gate line GL and the data line DL cross each other to define the first to fourth subpixels SP1 to SP4. Each of the first to fourth subpixels SP1 to SP4 is connected to the gate line GL and the data line DL. For example, the first to fourth subpixels SP1 to SP4 may correspond to red, green, blue and white colors, respectively.

When the display device 110 is an OLED display device, each of the first to fourth subpixels SP1 to SP4 may include a plurality of transistors such as a switching transistor, a driving transistor and a sensing transistor, a storage capacitor and a light emitting diode.

A structure of the display panel 140 and the subpixel SP of the display device 110 will be illustrated with reference to a drawing.

Figure 2:
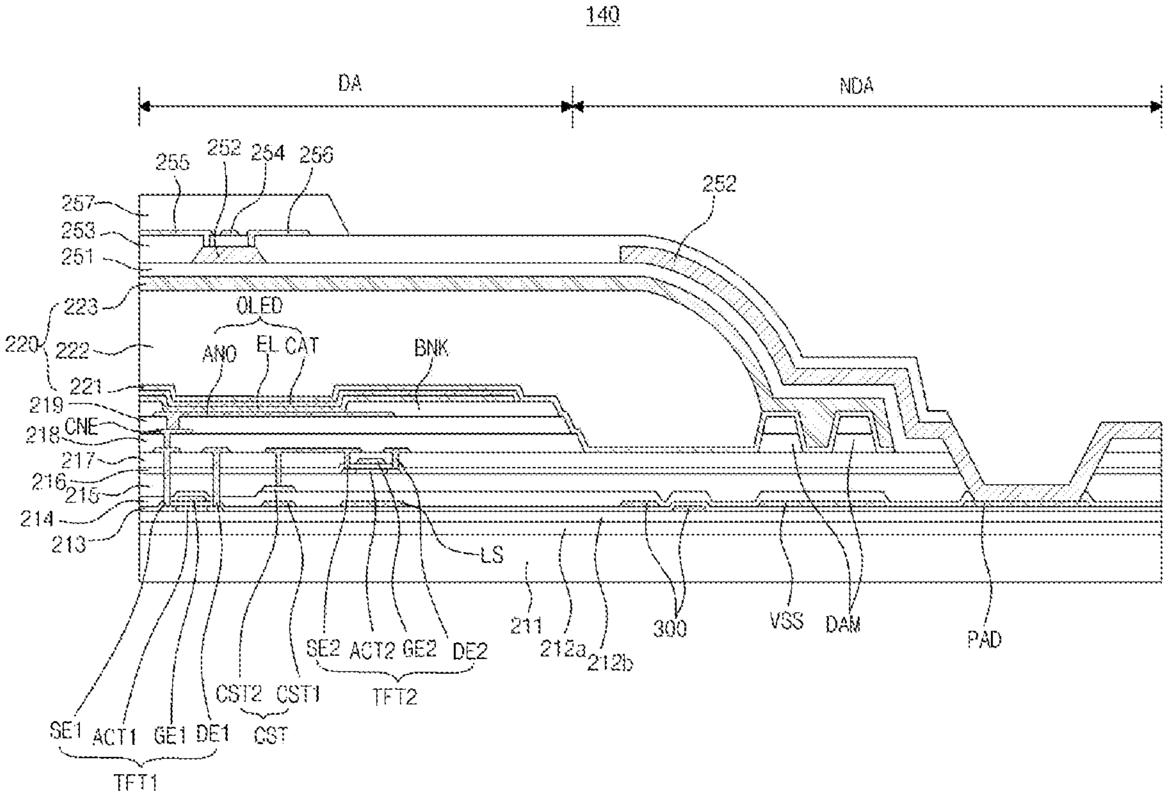
FIG. 2 is a cross-sectional view showing a display panel of a display device according to an aspect of the present disclosure.

FIG. 2 is a cross-sectional view showing a display panel of a display device according to an aspect of the present disclosure.

In FIG. 2, the display panel 140 of the display device according to an aspect of the present disclosure includes first and second thin film transistors TFT1 and TFT2 and a storage capacitor CST. The first and second thin film transistors TFT1 and TFT2 may include a polycrystalline semiconductor material or an oxide semiconductor material. For example, the first thin film transistor TFT1 may include a polycrystalline semiconductor material, and the second thin film transistor TFT2 may include an oxide semiconductor material.

The first thin film transistor TFT1 is connected to a light emitting diode OLED, and the second thin film transistor is connected to the storage capacitor CST.

One pixel P includes the light emitting diode OLED and a pixel circuit supplying a driving current to the light emitting diode OLED. The pixel circuit is disposed on a substrate 211, and the light emitting diode OLED is disposed in the pixel circuit. An encapsulating layer 220 is disposed on the light emitting diode OLED to protect the light emitting diode OLED.

The pixel circuit may include a driving thin film transistor, a switching thin film transistor and a storage capacitor. The light emitting diode OLED may include an anode, a cathode and an emitting layer between the anode and the cathode.

The driving thin film transistor and at least one switching thin film transistor use an oxide semiconductor material as an active layer. The thin film transistor using the oxide semiconductor material as an active layer has an excellent blocking effect for a leakage current and has a lower fabrication cost as compared with a thin film transistor using a polycrystalline semiconductor material as an active layer. As a result, to reduce a power consumption and a fabrication cost, the pixel circuit may include the driving thin film transistor and the at least one switching thin film transistor using the oxide semiconductor material.

For example, all of thin film transistors of the pixel circuit may be formed of the oxide semiconductor material, or a portion of the switching thin film transistors may be formed of the oxide semiconductor material.

The thin film transistor using the oxide semiconductor material has a relatively low reliability, while the thin film transistor using the polycrystalline semiconductor material has a relatively rapid operation speed and a relatively high reliability. As a result, the pixel circuit in an aspect may include both of a switching thin film transistor using the oxide semiconductor material and a switching thin film transistor using the polycrystalline semiconductor material.

The substrate 211 may have a multiple layer of an organic layer and an inorganic layer alternately laminated. For example, the substrate 211 may include an organic layer of an organic insulating material such as polyimide and an inorganic layer of an inorganic insulating material such as silicon oxide (SiO2) alternately laminated.

A lower buffer layer 212*a* is disposed on the substrate 211. The lower buffer layer 212*a* may block a moisture penetrable from an exterior and may have a multiple layer including silicon oxide (SiO2). An auxiliary buffer layer 212*b* for protecting elements from a moisture is disposed on the lower buffer layer 212*a*.

The first thin film transistor TFT1 is disposed on the substrate 211. The first thin film transistor TFT1 may use a polycrystalline semiconductor material as an active layer. The first thin film transistor TFT1 includes a first active layer ACT1 having a channel where an electron or a hole moves, a first gate electrode GE1, a first source electrode SE1 and a first drain electrode DEL.

The first active layer ACT1 includes a first channel region, a first source region at one side of the channel region and a first drain region at the other side of the channel region.

The first source region and the first drain region includes an intrinsic polycrystalline semiconductor material doped with an impurity of III or V group such as boron (B) or phosphorous (P). The first channel region includes an intrinsic polycrystalline semiconductor material to provide a path where an electron or a hole moves.

The first thin film transistor TFT1 includes a first gate electrode GE1 overlapping the first channel region of the first active layer ACT1. A first gate insulating layer 213 is disposed between the first gate electrode GE1 and the first active layer ACT1. The first gate insulating layer 213 may have a single layer or a multiple layer of an inorganic insulating material such as silicon oxide (SiO2) and silicon nitride (SiNx).

The first thin film transistor TFT1 has a top gate structure where the first gate electrode GE1 is disposed on the first active layer ACT1. As a result, a first capacitor electrode CST1 of the storage capacitor CST and a light shielding layer LS of the second thin film transistor TFT2 may have the same material as the first gate electrode GEL. A fabrication process may be simplified by forming the first gate electrode GE1, the first capacitor electrode CST1 and the light shielding layer LS through one mask process.

The first gate electrode GE1 may include a metallic material. For example, the first gate electrode GE1 may have a single layer or a multiple layer of one of molybdenum (Mo), aluminum (Al), chromium (Cr), gold (Au), titanium (Ti), nickel (Ni), neodymium (Nd), copper (Cu) and an alloy thereof.

A first interlayer insulating layer 214 is disposed on the first gate electrode GE1. The first interlayer insulating layer 214 may include an inorganic insulating material such as silicon oxide (SiO2) and silicon nitride (SiNx).

The display panel 140 may further include an upper buffer layer 215, a second gate insulating layer 216 and a second interlayer insulating layer 217 sequentially disposed on the first interlayer insulating layer 214. The first thin film transistor TFT1 may include a first source electrode SE1 and a first drain electrode DE1 on the second interlayer insulating layer 217, and the first source electrode SE1 and the first drain electrode DE1 may be connected to the first source region and the first drain region, respectively.

The first source electrode SE1 and the first drain electrode DE1 may have a single layer or a multiple layer of one of molybdenum (Mo), aluminum (Al), chromium (Cr), gold (Au), titanium (Ti), nickel (Ni), neodymium (Nd), copper (Cu) and an alloy thereof.

The upper buffer layer 215 separates a second active layer ACT2 of an oxide semiconductor material of the second thin film transistor TFT2 from the first active layer ACT1 of a polycrystalline semiconductor material and provides a base for the second active layer ACT2.

The second gate insulating layer 216 covers the second active layer ACT2 of the second thin film transistor TFT2. Since the second gate insulating layer 216 is disposed on the second active layer ACT2 of an oxide semiconductor material, the second gate insulating layer 216 includes an inorganic insulating material. For example, the second gate insulating layer 216 may include silicon oxide (SiO2) and silicon nitride (SiNx).

A second gate electrode GE2 includes a metallic material. For example, the second gate electrode GE2 may have a single layer or a multiple layer of one of molybdenum (Mo), aluminum (Al), chromium (Cr), gold (Au), titanium (Ti), nickel (Ni), neodymium (Nd), copper (Cu) and an alloy thereof.

The second thin film transistor TFT2 is disposed on the upper buffer layer 215 and includes the second active layer ACT2 of an oxide semiconductor material, the second gate electrode GE2 on the second gate insulating layer 216, a second source electrode SE2 and a second drain electrode DE2 on the second interlayer insulating layer 217.

The second active layer ACT2 includes a second channel region, a second source region and a second drain region. The second channel region includes an intrinsic oxide semiconductor material which is not doped with an impurity, and the second source electrode and the second drain electrode are doped with an impurity to be conductorized.

The second thin film transistor TFT2 is disposed above the upper buffer layer 215 and further includes a light shielding layer LS overlapping the second active layer ACT2. The light shielding layer LS blocks a light incident to the second active layer ACT2 to obtain a reliability of the second thin film transistor TFT2. The light shielding layer LS may include the same material as the first gate electrode GE1 and may be disposed on a top surface of the first gate insulating layer 213. The light shielding layer LS may be electrically connected to the second gate electrode GE2 to constitute a dual gate structure.

A fabrication process may be simplified by forming the second source electrode SE2 and the second drain electrode DE2 on the second interlayer insulating layer 217 simultaneously with the first source electrode SE1 and the first drain electrode DE1 through one mask process.

A second capacitor electrode CST2 is disposed on the first interlayer insulating layer 214. The second capacitor electrode CST2 overlaps the first capacitor electrode CST1 to constitute a storage capacitor CST. For example, the second capacitor electrode CST2 may have a single layer or a multiple layer of one of molybdenum (Mo), aluminum (Al), chromium (Cr), gold (Au), titanium (Ti), nickel (Ni), neodymium (Nd), copper (Cu) and an alloy thereof.

The storage capacitor CST stores the data signal supplied through the data line DL and supplies the data signal to the light emitting diode OLED. The storage capacitor CST includes two electrodes corresponding to each other and a dielectric layer between the two electrodes. A first interlayer insulating layer 214 is disposed between the first capacitor electrode CST1 and the second capacitor electrode CST2.

One of the first and second capacitor electrodes CST1 and CST2 of the storage capacitor CST may be electrically connected to one of the second source electrode SE2 and the second drain electrode DE2 of the second thin film transistor TFT2. In another aspect, a connection of the storage capacitor CST may be changed according to the pixel circuit.

A first planarizing layer 218 and a second planarizing layer 219 are sequentially disposed on the pixel circuit for planarizing the pixel circuit. The first planarizing layer 218 and the second planarizing layer 219 may include an organic insulating material such as polyimide and acrylic resin.

A light emitting diode OLED is disposed on the second planarizing layer 219.

The light emitting diode OLED includes an anode ANO, a cathode CAT and an emitting layer EL between the anode ANO and the cathode CAT. When the pixel circuit uses a low level voltage Vss (of FIG. 4) connected to the cathode CAT commonly, the anode ANO may be disposed in each subpixel as an individual electrode. When the pixel circuit uses a high level voltage connected to the anode ANO commonly, the cathode CAT may be disposed in each subpixel as an individual electrode.

The light emitting diode OLED is electrically connected to a driving element through a central electrode CNE on the first planarizing layer 218. The anode ANO of the light emitting diode OLED and the first source electrode SE1 of the first thin film transistor TFT1 of the pixel circuit are connected to each other through the central electrode CNE.

The anode ANO is connected to the central electrode CNE through a contact hole in the second planarizing layer 219. The central electrode CNE is connected to the first source electrode SE1 through a contact hole in the first planarizing layer 218.

The central electrode CNE connects the first source electrode SE1 and the anode ANO. The central electrode CNE may include a conductive material such as copper (Cu), silver (Ag), molybdenum (Mo) and titanium (Ti).

The anode ANO may have a multiple layer including a transparent conductive layer and an opaque conductive layer having an excellent reflectance. The transparent conductive layer may include a material having a relatively high work function such as indium tin oxide (ITO) and indium zinc oxide (IZO). The opaque conductive layer may have a single layer or a multiple layer of one of aluminum (Al), silver (Ag), copper (Cu), lead (Pb), molybdenum (Mo), titanium (Ti) and an alloy thereof. For example, the anode ANO may have a structure such that a transparent conductive layer, an opaque conductive layer and a transparent conductive layer are sequentially laminated or a structure such that a transparent conductive layer and an opaque conductive layer are sequentially laminated.

The emitting layer EL includes a hole relating layer, an organic emitting layer and an electron relating layer sequentially or reversely laminated.

A bank layer BNK may be referred to as a pixel defining layer exposing the anode ANO of each subpixel SP1 to SP4. The bank layer BNK may include an opaque material (e.g., a black material) to prevent a light interference between the adjacent subpixels SP1 to SP4. The bank layer BNK may include a shielding material of at least one of a color pigment, an organic black and a carbon. A spacer may be disposed on the bank layer BNK.

The cathode CAT is disposed on a top surface and a side surface of the emitting layer EL to oppose the anode ANO. The cathode CAT may be disposed in the entire display area DA as one body. In a top emission type display device, the cathode CAT may include a transparent conductive material such as indium tin oxide (ITO) and indium zinc oxide (IZO).

An encapsulating layer 220 preventing permeation of a moisture may be disposed on the cathode CAT.

The encapsulating layer 220 may block permeation of a moisture or an oxygen of an exterior into the emitting layer EL. The encapsulating layer 220 may include at least one inorganic encapsulating layer and at least one organic encapsulating layer. The encapsulating layer 220 may exemplarily include a first encapsulating layer 221, a second encapsulating layer 222 and a third encapsulating layer 223 in the display device 110.

The first encapsulating layer 221 is disposed on the substrate 211 having the cathode CAT. The third encapsulating layer 223 is disposed on the substrate 211 having the second encapsulating layer 222 and wraps a top surface, a bottom surface and a side surface of the second encapsulating layer 222 with the first encapsulating layer 221. The first encapsulating layer 221 and the third encapsulating layer 223 may minimize or prevent permeation of a moisture or an oxygen of an exterior into the emitting layer EL. The first encapsulating layer 221 and the third encapsulating layer 223 may include an inorganic insulating material applicable to a low temperature deposition such as silicon nitride (SiNx), silicon oxide (SiOx), silicon oxynitride (SiON) and aluminum oxide ($Al_2O_3$). Deterioration of the emitting layer EL vulnerable to a relatively high temperature may be prevented by depositing the first encapsulating layer 221 and the third encapsulating layer 223 under a relatively low temperature.

The second encapsulating layer 222 may alleviate a stress between the layers of the display device 110 due to bending and may planarize a step difference of the layers of the display device 110. The second encapsulating layer 222 may be disposed on the substrate 211 having the first encapsulating layer 221 and may include a non-photosensitive organic insulating material such as acrylic resin, epoxy resin, phenolic resin, polyamide resin, polyimide resin, polyethylene and silicon oxycarbide (SiOC) or a photosensitive organic insulating material such as photoacryl. When the second encapsulating layer 222 is formed through an inkjet method, a dam DAM may be disposed to prevent diffusion of the liquid material for the second encapsulating layer 222 to an edge portion of the substrate 211. The dam DAM may be disposed closer to the edge portion of the substrate 211 than the second encapsulating layer 222. Due to the dam DAM, it is prevented that the second encapsulating layer 222 is diffused to a pad area of an outermost edge portion of the substrate 211 where a conductive pad is disposed.

Although the dam DAM is disposed to prevent diffusion of the second encapsulating layer 222, a moisture may permeate the emitting layer through the exposed second encapsulating layer 222 when the second encapsulating layer 222 is formed higher than the dam DAM. As a result, the dam DAM may be formed to have a number of at least ten.

The dam DAM may be disposed on the second interlayer insulating layer 217 in the non-display area NDA.

The dam DAM may be formed simultaneously with the first planarizing layer 218 and the second planarizing layer 219. For example, a lower layer of the dam DAM may be formed simultaneously with the first planarizing layer 218 and an upper layer of the dam DAM may be formed simultaneously with the second planarizing layer 219 such that the dam DAM has a double layered structure.

As a result, the dam DAM may have the same material as the first planarizing layer 218 and the second planarizing layer 219.

The dam DAM may be disposed to overlap a low level voltage line VSS. For example, the low level voltage line VSS may be disposed under the dam DAM in the non-display area NDA.

The low level voltage line VSS and the first and second gate driving units 130 and 135 having a gate-in-panel (GIP) type are disposed to surround the display area DA of the display panel 140, and the low level voltage line VSS may be disposed outside the first and second gate driving units 130 and 135. Further, the low level voltage line VSS may be connected to the cathode CAT to supply a common voltage. Although the first and second gate driving units 130 and 135 are shown to have a simple structure in FIG. 1, the first and second gate driving units 130 and 135 may include thin film transistors having the same structure as the thin film transistor of the display area DA.

For example, the low level voltage line VSS may have the same material as the first gate electrode GE1 or the same material as the second capacitor electrode CST2, the first source electrode SE1 and the first drain electrode DE1.

The low level voltage line VSS may supply a low level voltage Vss (of FIG. 4) to the subpixel SP1 to SP4 in the display area DA.

A touch layer may be disposed on the encapsulating layer 220. A touch buffer layer 251 of the touch layer may be disposed between a touch sensor metal and the cathode CAT of the light emitting diode OLED, and the touch sensor metal may include a touch connecting line 252 and 254 and a touch electrode 255 and 256.

The touch buffer layer 251 may block permeation of a solution (a developing solution or an etching solution) used in a fabrication process of the touch sensor metal on the touch buffer layer 251 or a moisture of an exterior into the emitting layer EL including an organic material. As a result, the touch buffer layer 251 may prevent deterioration of the emitting layer EL susceptible to a solution or a moisture.

The touch buffer layer 251 includes an organic insulating material applicable to a low temperature lower than about 100° C. and having a dielectric constant of about 1 to about 3 to prevent deterioration of the emitting layer EL including an organic material vulnerable to a relatively high temperature. For example, the touch buffer layer 251 may include a material of an acrylic group, an epoxy group or a siloxane group. The touch buffer layer 251 of an organic insulating material having a planarization property may prevent deterioration of the encapsulating layer 220 due to a bending of the display device 110 and a breakdown of the touch sensor metal on the touch buffer layer 251.

In a touch sensor structure based on a mutual capacitance, the touch electrodes 255 and 256 may be disposed on the touch buffer layer 251 and may alternate each other.

The touch connecting line 252 and 254 may connect the touch electrodes 255 and 256. The touch connecting line 252 and 254 and the touch electrodes 255 and 256 may be disposed in different layers, and a touch insulating layer 253 may be disposed between the touch connecting line 252 and 254 and the touch electrodes 255 and 256.

The touch connecting line 252 and 254 may be disposed to overlap the bank layer BNK to prevent reduction of an aperture ratio.

The touch electrodes 255 and 256 may be electrically connected to a touch driving circuit (not shown) through a portion of the touch connecting line 252 connected to a touch pad PAD passing through a top surface and a side surface of the encapsulating layer 220 and a top surface and a side surface of the dam DAM.

The portion of the touch connecting line 252 may receive a touch driving signal from the touch driving circuit and may transmit the touch driving signal to the touch electrode 255 and 256. The portion of the touch connecting line 252 may transmit a touch sensing signal of the touch electrodes 255 and 256 to the touch driving circuit.

A touch protecting layer 257 may be disposed on the touch electrodes 255 and 256. Although the touch protecting layer 257 is disposed on the touch electrodes 255 and 256 in an aspect of FIG. 2, the touch protecting layer 257 may extend a front or a rear of the dam DAM to be disposed on the touch connecting line 252.

A color filter (not shown) may be disposed on the encapsulating layer 220. The color filter may be disposed on the touch layer or may be disposed between the encapsulating layer 220 and the touch layer.

A structure and an operation of the first and second gate driving units 130 and 135 and the first, second, third and fourth subpixels SP1, SP2, SP3 and SP4 of the display device 110 will be illustrated with reference to a drawing.

Figure 3:
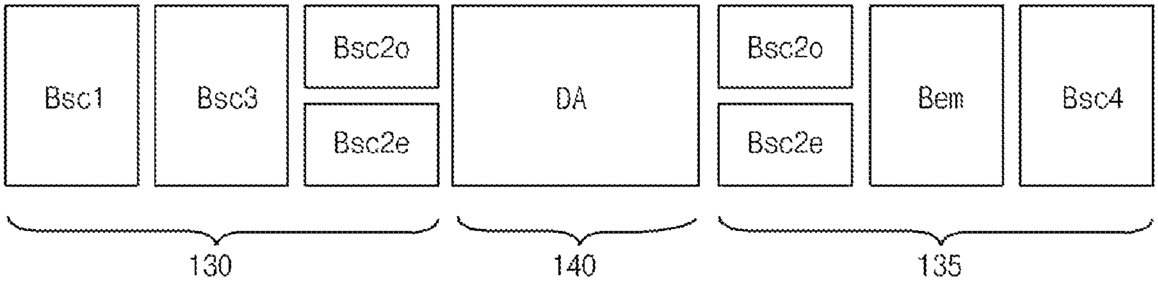
FIG. 3 is a block diagram showing first and second gate driving units and a display panel of a display device according to an aspect of the present disclosure.
Figure 4:
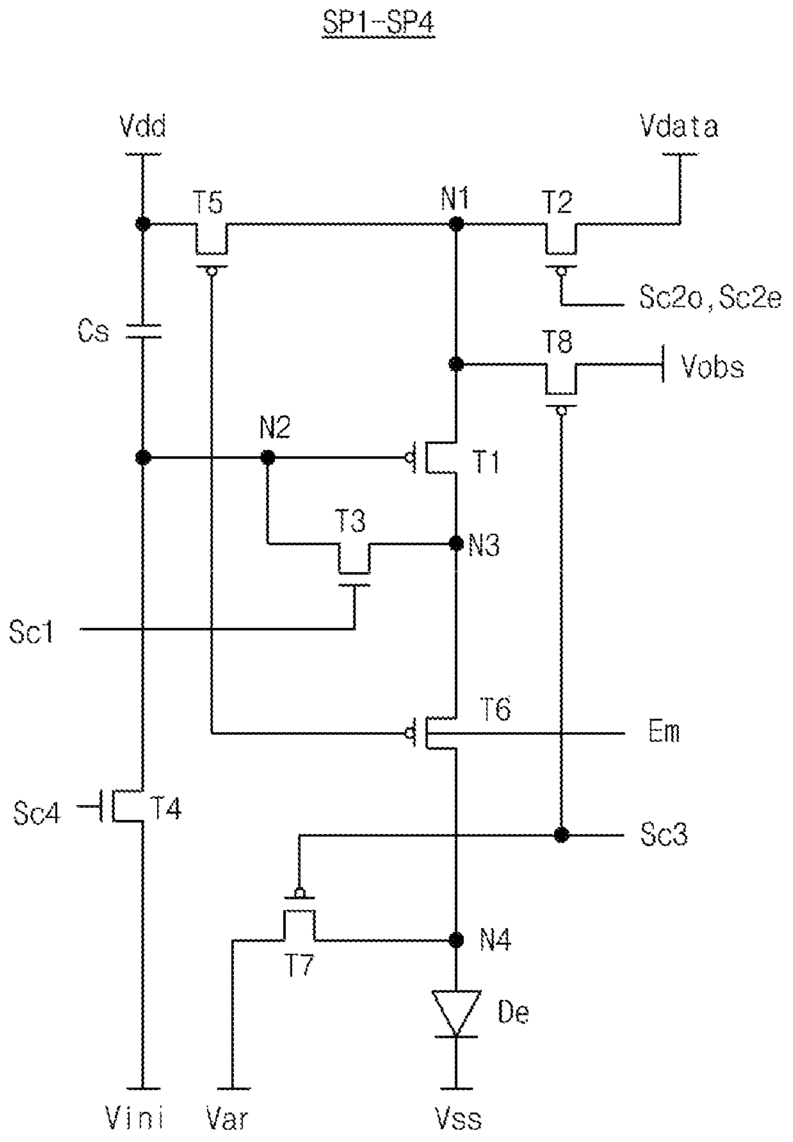
FIG. 4 is a circuit diagram showing a subpixel of a display device according to an aspect of the present disclosure.

FIG. 3 is a block diagram showing first and second gate driving units and a display panel of a display device according to an aspect of the present disclosure, and FIG. 4 is a circuit diagram showing a subpixel of a display device according to an aspect of the present disclosure.

In the display device 110 of FIG. 3, the first gate driving unit 130 includes a gate1 signal block Bsc1, an odd gate2 signal block Bsc2*o*, an even gate2 signal block Bsc2*e* and a gate3 signal block Bsc3, and the second gate driving unit 135 includes an odd gate2 signal block Bsc2*o*, an even gate2 signal block Bsc2*e*, a gate4 signal block Bsc4 and an emission signal block Bern. The display area DA of the display panel 140 is disposed between the first and second gate driving units 130 and 135.

In another aspect, the disposition structure of the gate1 signal block Bsc1, the odd gate2 signal block Bsc2*o*, the even gate2 signal block Bsc2*e*, the gate3 signal block Bsc3, the gate4 signal block Bsc4 and the emission signal block Bem in the first and second gate driving units 130 and 135 may be variously changed.

In FIG. 3, the gate1 signal block Bsc1 is disposed farther from the display panel 140 than the gate3 signal block Bsc3 and the gate4 signal block Bsc4 is disposed farther from the display panel 140 than the emission signal block Bem. In another aspect, the gate3 signal block Bsc3 may be disposed farther from the display panel 140 than the gate1 signal block Bsc1 and the emission signal block Bem may be disposed farther from the display panel 140 than the gate4 signal block Bsc4.

Each of the gate1 signal block Bsc1, the odd gate2 signal block Bsc2*o*, the even gate2 signal block Bsc2*e* and the gate3 signal block Bsc3 of the first gate driving unit 130 and the odd gate2 signal block Bsc2*o*, the even gate2 signal block Bsc2*e*, the gate4 signal block Bsc4 and the emission signal block Bem of the second gate driving unit 135 may be one stage of a shift register, and the shift register may include a plurality of stages connected to each other in a cascade type.

In the first gate driving unit 130, the gate1 signal block Bsc1, the odd gate2 signal block Bsc2*o*, the even gate2 signal block Bsc2*e* and the gate3 signal block Bsc3 generate a gate1 signal Sc1 (of FIG. 4), an odd gate2 signal Sc2*o* (of FIG. 4), an even gate2 signal Sc2*e* (of FIG. 4) and a gate3 signal Sc3 (of FIG. 4), respectively.

In the second gate driving unit 135, the odd gate2 signal block Bsc2*o*, the even gate2 signal block Bsc2*e*, the gate4 signal block Bsc4 and the emission signal block Bem generate an odd gate2 signal Sc2*o* (of FIG. 4), an even gate2 signal Sc2*e* (of FIG. 4), a gate4 signal Sc4 (of FIG. 4) and an emission signal Em (of FIG. 4), respectively.

The clock signal block Bcl includes a plurality of clock lines transmitting a clock signal used in the stage circuit block Bsc.

The gate1 signal Sc1 of the gate1 signal block Bsc1 is supplied to a third transistor T3 (of FIG. 4) in each subpixel SP1 to SP4 of the display area DA through the gate line GL. The odd gate2 signal Sc2*o* of the odd gate2 signal block Bsc2*o* is supplied to a second transistor T2 (of FIG. 4) in each subpixel SP1 to SP4 of an odd horizontal pixel line of the display area DA through the gate line GL, and the even gate2 signal Sc2*e* of the even gate2 signal block Bsc2*e* is supplied to a second transistor T2 (of FIG. 4) in each subpixel SP1 to SP4 of an even horizontal pixel line of the display area DA through the gate line GL.

The gate3 signal Sc3 of the gate3 signal block Bsc3 is supplied to seventh and eighth transistors T7 and T8 (of FIG. 4) in each subpixel SP1 to SP4 of the display area DA through the gate line GL. The gate4 signal Sc4 of the gate4 signal block Bsc4 is supplied to a fourth transistor T4 (of FIG. 4) in each subpixel SP1 to SP4 of the display area DA through the gate line GL, and the emission signal Em of the emission signal block Bem is supplied to fifth and sixth transistors T5 and T6 (of FIG. 4) in each subpixel SP1 to SP4 of the display area DA through the gate line GL.

In another aspect, the first and second gate driving units 130 and 135 may have a symmetric structure. For example, each of the first and second gate driving units 130 and 135 may include the gate1 signal block Bsc1, the odd gate2 signal block Bsc2*o*, the even gate2 signal block Bsc2*e*, the gate3 signal block Bsc3, the gate4 signal block Bsc4 and the emission signal block Bem.

In FIG. 4, each of the first to fourth subpixels SP1 to SP4 of the display panel 140 of the display device 110 according to an aspect of the present disclosure includes first to eighth transistors T1 to T8, a storage capacitor Cs and a light emitting diode De. At least one of the first to eighth transistors T1 to T8 may be an oxide semiconductor thin film transistor, and the others of the first to eighth transistors T1 to T8 may be low temperature polycrystalline silicon thin film transistor.

For example, the first, second, fifth, sixth, seventh and eighth transistors T1, T2, T5, T6, T7 and T8 may be a positive (P) type low temperature polycrystalline silicon thin film transistor, and the third and fourth transistors T3 and T4 may be a negative (N) type oxide semiconductor thin film transistor.

The first transistor T1 of a driving transistor is switched according to a voltage of the first capacitor electrode of the storage capacitor Cs. A gate electrode of the first transistor T1 is connected to the first capacitor electrode of the storage capacitor Cs, a drain electrode of the third transistor T3 and a drain electrode of the fourth transistor T4, a source electrode of the first transistor T1 is connected to a source electrode of the second transistor T2, a drain electrode of the fifth transistor T5 and a source electrode of the eighth transistor T8, and a drain electrode of the first transistor T1 is connected to a source electrode of the third transistor T3 and a source electrode of the sixth transistor T6.

The second transistor T2 of a switching transistor is switched according to an nth odd gate2 signal Sc2*o*(*n*) or an nth even gate2 signal Sc2*e*(*n*). A gate electrode of the second transistor T2 is connected to the nth odd gate2 signal Sc2*o*(*n*) or the nth even gate2 signal Sc2*e*(*n*), a source electrode of the second transistor T2 is connected to a source electrode of the first transistor T1, a drain electrode of the fifth transistor T5 and a source electrode of the eighth transistor T8, and a drain electrode of the second transistor T2 is connected to the data signal Vdata.

The third transistor T3 of a sensing transistor is switched according to an nth gate1 signal Sc1(*n*). A gate electrode of the third transistor T3 is connected to the nth gate1 signal Sc1(*n*), a source electrode of the third transistor T3 is connected to a drain electrode of the first transistor T1 and a source electrode of the sixth transistor T6, and a drain electrode of the third transistor T3 is connected to a gate electrode of the first transistor T1, a first capacitor electrode of the storage capacitor Cs and a drain electrode of the fourth transistor T4.

The fourth transistor T4 is switched according to an (n−1)th gate1 signal Sc1(*n*−1). A gate electrode of the fourth transistor T4 is connected to the (n−1)th gate1 signal Sc1 (*n*−1), a source electrode of the fourth transistor T4 is connected to an initial voltage Vini, and a drain electrode of the fourth transistor T4 is connected to a gate electrode of the first transistor T1, a first capacitor electrode of the storage capacitor Cs and a drain electrode of the third transistor T3.

The fifth transistor T5 of an emission transistor is switched according to an nth emission signal Em(n). A gate electrode of the fifth transistor T5 is connected to the nth emission signal Em(n), a source electrode of the fifth transistor T5 is connected to a high level voltage Vdd and the second capacitor electrode of the storage capacitor Cs, and a drain electrode of the fifth transistor T5 is connected to a source electrode of the first transistor T1, a source electrode of the second transistor T2 and a source electrode of the eighth transistor T8.

The sixth transistor T6 of an emission transistor is switched according to an nth emission signal Em(n). A gate electrode of the sixth transistor T6 is connected to the nth emission signal Em(n), a source electrode of the sixth transistor T6 is connected to a drain electrode of the first transistor T1 and a source electrode of the third transistor T3, and a drain electrode of the sixth transistor T6 is connected to an anode of the light emitting diode De and a source electrode of the seventh transistor T7.

The seventh transistor T7 is switched according to an nth gate3 signal Sc3(*n*). A gate electrode of the seventh transistor T7 is connected to the nth gate3 signal Sc3(*n*), a source electrode of the seventh transistor T7 is connected to a drain electrode of the sixth transistor T6 and an anode of the light emitting diode De, and a drain electrode of the seventh transistor T7 is connected to an anode reset voltage Var.

The eighth transistor T8 is switched according to an nth gate3 signal Sc3(*n*). A gate electrode of the eighth transistor T8 is connected to the nth gate3 signal Sc3(*n*), a source electrode of the eighth transistor T8 is connected to a source electrode of the first transistor T1, a source electrode of the second transistor T2 and a drain electrode of the fifth transistor T5, and a drain electrode of the eighth transistor T8 is connected to a stress voltage Vobs.

The storage capacitor Cs stores the data signal Vdata and the threshold voltage Vth. A first capacitor electrode of the storage capacitor Cs is connected to the gate electrode of the first transistor T1 and the drain electrode of the fourth transistor T4, and a second capacitor electrode of the storage capacitor Cs is connected to the high level voltage Vdd and the source electrode of the fifth transistor T5.

The light emitting diode De is connected between the sixth and seventh transistors T6 and T7 and the low level voltage Vss to emit a light of a luminance proportional to a current of the first transistor T1. An anode of the light emitting diode De is connected to the drain electrode of the sixth transistor T6 and the source electrode of the seventh transistor T7, and a cathode of the light emitting diode De is connected to the low level voltage Vss.

The source electrode of the first transistor T1, the source electrode of the second transistor T2, the drain electrode of the fifth transistor T5 and the source electrode of the eighth transistor T8 constitute a first node N1, and the gate electrode of the first transistor T1, the drain electrode of the third transistor T3, the first capacitor electrode of the storage capacitor Cs and the drain electrode of the fourth transistor T4 constitute a second node N2. The source electrode of the first transistor T1, the drain electrode of the third transistor T3 and the source electrode of the sixth transistor T6 constitute a third node N3, and the drain electrode of the sixth transistor T6, the source electrode of the seventh transistor T7 and the anode of the light emitting diode De constitute a fourth node N4.

In the display device 110, an image is displayed by modulating a frequency (i.e., a refresh rate) according to a mode.

For example, the display device 110 operates with a frequency of about 120 Hz in a high speed mode where a general image, a scroll or an animation are displayed, the display device 110 operates with a frequency of about 60 Hz in a middle speed mode where a slow video is displayed, and the display device 110 operates with a frequency of about 1 Hz to about 10 Hz in a low speed mode where a static image is displayed.

Further, the display device 110 may operate by classifying a single frame into a refresh subframe SFrf (of FIG. 8A) where the data signal Vdata is inputted and an anode reset subframe SFar (of FIG. 8B) in the middle speed mode or the low speed mode.

Figure 8A:
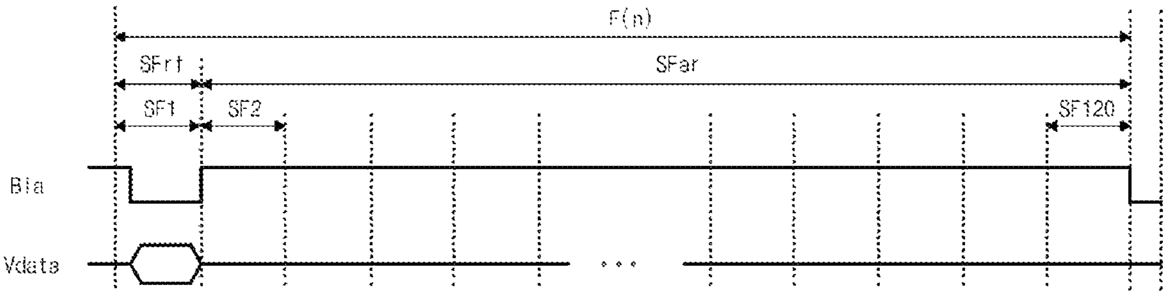
FIGS. 8A and 8B are views showing a plurality of signals in an nth frame of a low frequency and an (n+1)th frame of a high frequency, respectively, of a display device according to an aspect of the present disclosure.

For example, in an operation with a frequency of about 60 Hz, a single frame of about 1 second may be classified into 120 subframes SF1 to SF120 (shown in FIG. 8A). The 1st, 3rd, . . . , 119th subframes SF1, SF3, . . . , SF119 may be used as the refresh subframe SFrf, and the 2nd, 4th, . . . , 120th subframes SF2, SF4, . . . , SF120 may be used as the anode reset subframe SFar.

In an operation with a frequency of about 30 Hz, a single frame of about 1 second may be classified into 120 subframes SF1 to SF120. The 1st, 5th, . . . , 117th subframes SF1, SF5, . . . , SF117 may be used as the refresh subframe SFrf, and the 2nd to 4th, 6th to 8th, . . . , 118th to 120th subframes SF2 to SF4, SF6 to SF8, . . . , SF118 to SF120 may be used as the anode reset subframe SFar. In an operation with a frequency of about 10 Hz, a single frame of about 1 second may be classified into 120 subframes SF1 to SF120. The 1st, 13th, . . . , 109th subframes SF1, SF13, . . . , SF109 may be used as the refresh subframe SFrf, and the 2nd to 12th, 14th to 24th, . . . , 110th to 120th subframes SF2 to SF12, SF14 to SF24, . . . , SF110 to SF120 may be used as the anode reset subframe SFar.

In an operation with a frequency of about 1 Hz, a single frame of about 1 second may be classified into 120 subframes SF1 to SF120. The 1st subframe SF1 may be used as the refresh subframe SFrf, and the 2nd to 120th subframes SF2 to SF120 may be used as the anode reset subframe SFar.

In the display device 110, when an event occurs in an operation of the low speed mode, a response property is improved by inserting a high frequency period.

Figure 5:
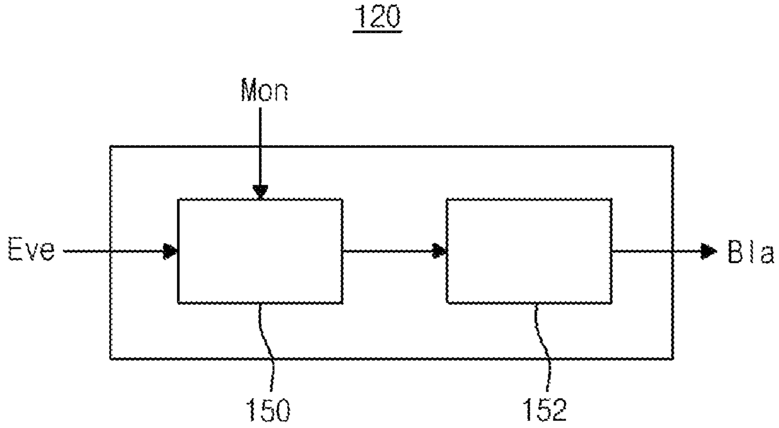
FIG. 5 is a view showing a timing controlling unit of a display device according to an aspect of the present disclosure.
Figure 6:
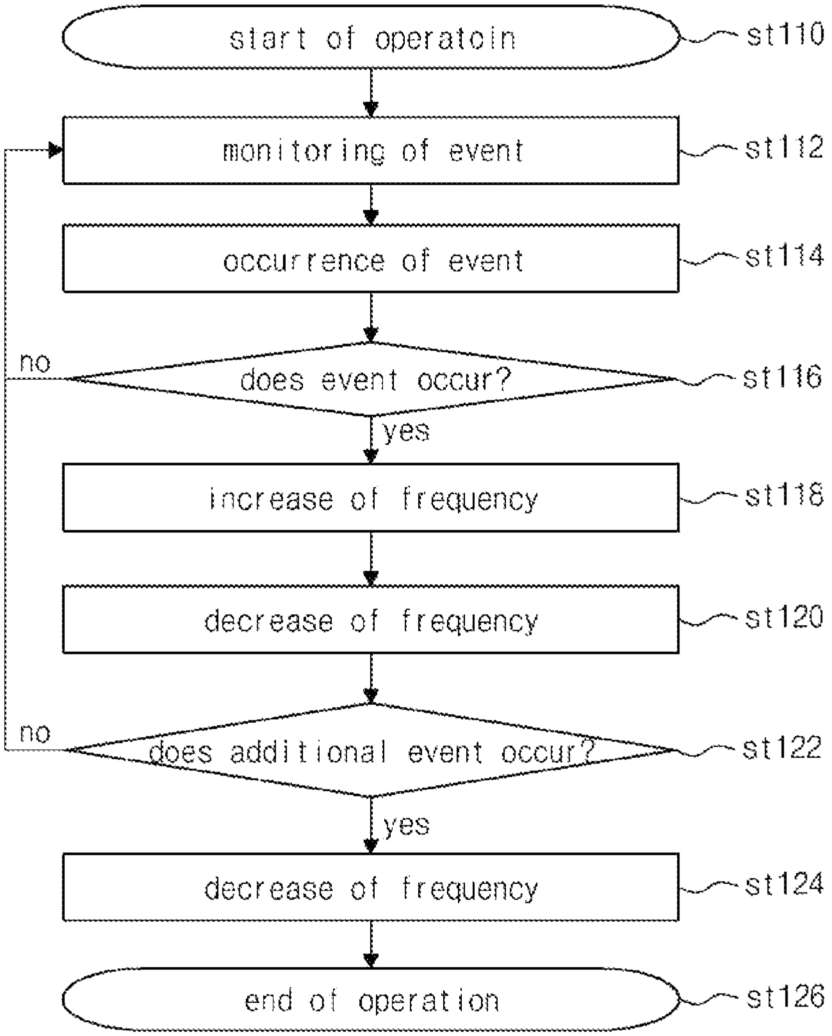
FIG. 6 is a flow chart showing a method of driving a display device according to an aspect of the present disclosure.
Figure 7:
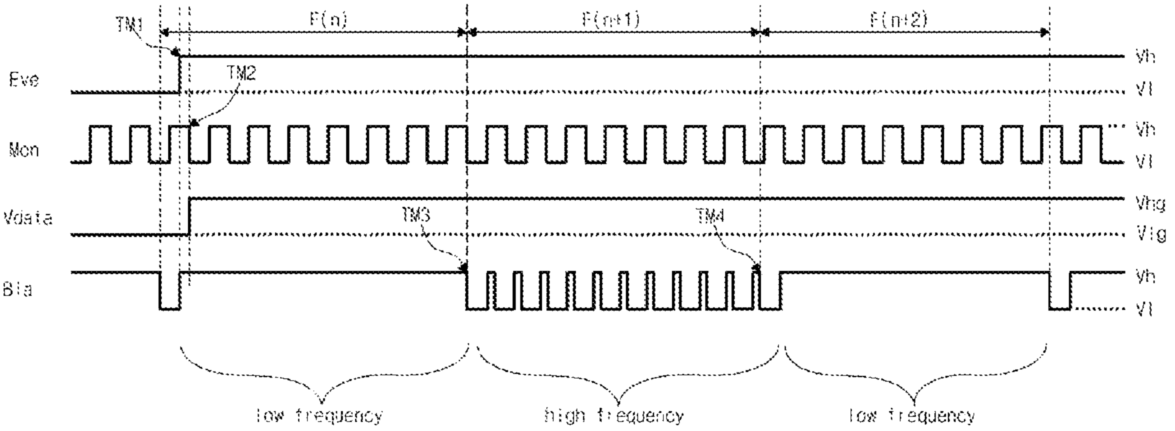
FIG. 7 is a view showing a plurality of signals in a plurality of frames of a display device according to an aspect of the present disclosure.
Figure 8B:
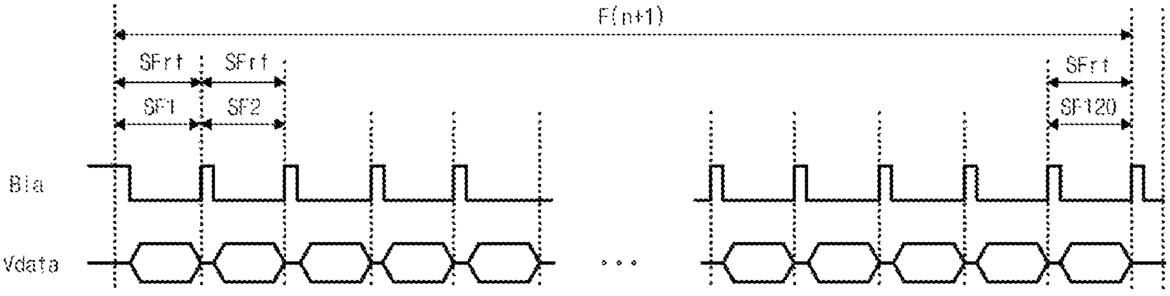
Figure 9A:
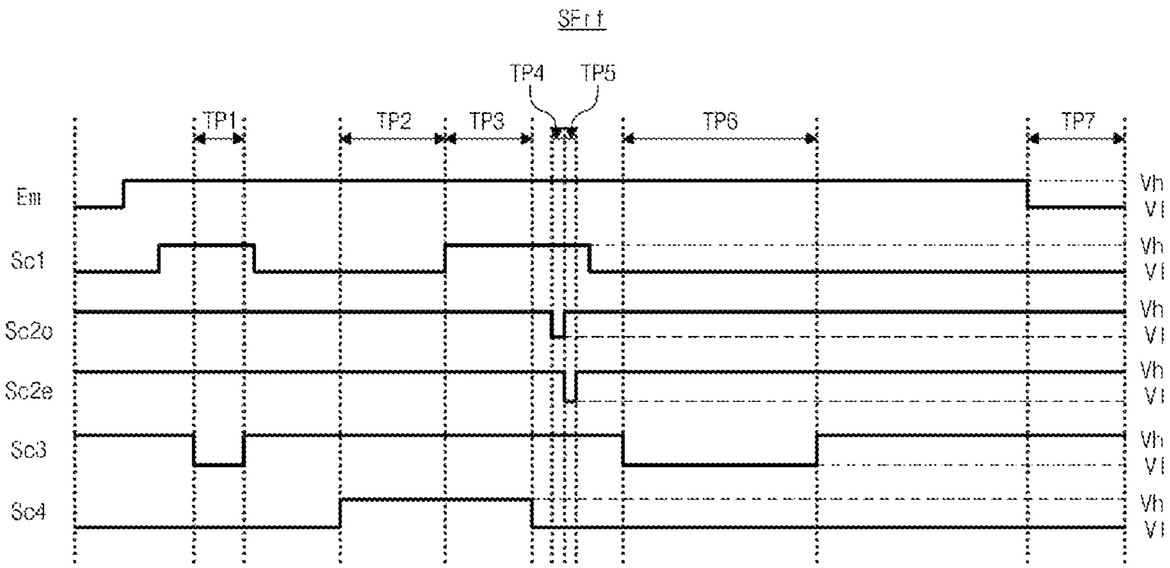
FIGS. 9A and 9B are views showing a plurality of signals in a refresh subframe and an anode reset subframe, respectively, of a display device according to an aspect of the present disclosure.
Figure 9B:
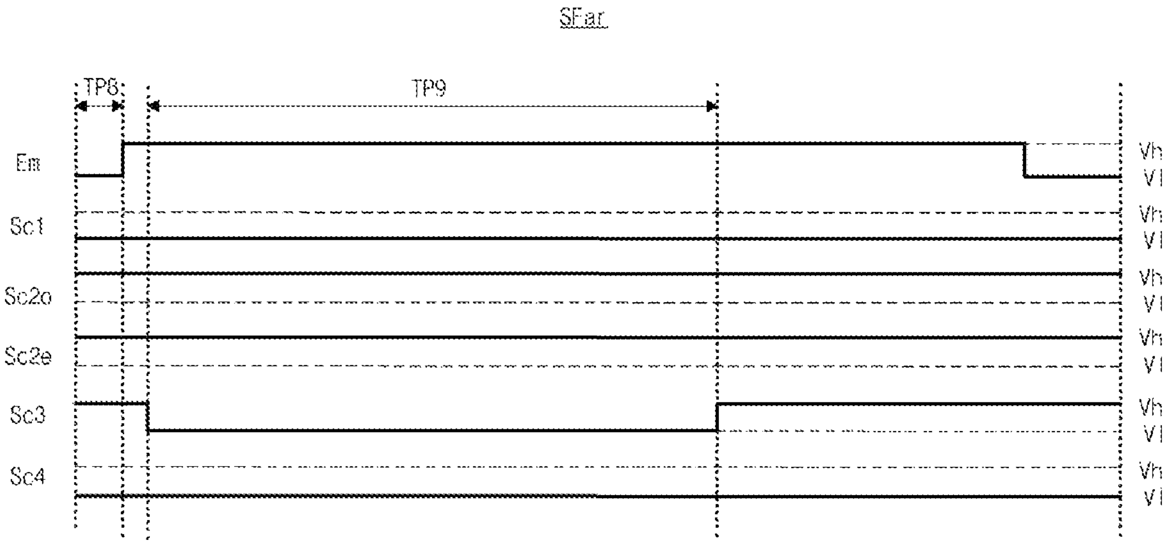

FIG. 5 is a view showing a timing controlling unit of a display device according to an aspect of the present disclosure, FIG. 6 is a flow chart showing a method of driving a display device according to an aspect of the present disclosure, FIG. 7 is a view showing a plurality of signals in a plurality of frames of a display device according to an aspect of the present disclosure, FIGS. 8A and 8B are views showing a plurality of signals in an nth frame of a low frequency and an (n+1) th frame of a high frequency, respectively, of a display device according to an aspect of the present disclosure, and FIGS. 9A and 9B are views showing a plurality of signals in a refresh subframe and an anode reset subframe, respectively, of a display device according to an aspect of the present disclosure.

In FIGS. 5 to 7, the display device 110 according to an aspect of the present disclosure starts to operate in a low speed mode of a low frequency for displaying a static image (st110).

For example, the timing controlling unit 120 of the display device 110 may supply an image data of a low gray level such as a black pattern to the data driving unit 125 in a low speed mode of a low frequency of about 1 Hz to about 10 Hz, the data driving unit 125 may supply the data signal Vdata corresponding to the image data of a low gray level, and the display panel 140 may display the static image using the data signal Vdata corresponding to the image data of a low gray level.

Next, the display device 110 monitors an event (st112).

The event means all of inputs sensing an input of a user in a sleep mode such as an always on display (AOD). For example, the event may include a touch input, a physical button input and an unlock input such as a fingerprint recognition or a facial recognition to the display panel 140.

The event may be converted into an event signal Eve switching between a logic high voltage Vh and a logic low voltage V1 to be supplied to the monitoring part 150 of the timing controlling unit 120 of the display device 110. For example, when the event occurs, the event signal Eve may be changed from the logic high voltage Vh to the logic low voltage V1 or may be changed from the logic low voltage V1 to the logic high voltage Vh, and the event signal Eve may be supplied from an input part of a touch panel or a smart phone.

The timing controlling unit 120 of the display device 110 may observe or monitor whether the event occurs using the monitoring signal Mon including a plurality of pulses periodically switching between the logic high voltage Vh and the logic low voltage V1. For example, the timing controlling unit 120 may observe or monitor whether the event occurs at a falling timing of the monitoring signal Mon from the logic high voltage Vh to the logic low voltage V1.

Next, the event occurs in the display device 110 (st114).

For example, the event may occur in the display device 110 at a first timing TM1, and the occurrence of the event may require a drastic gray level change of the image displayed by the display device 110 (e.g., a change from a low gray level such as a black pattern to a high gray level such as a white pattern or a change from a high gray level such as a white pattern to a low gray level such as a black pattern).

Next, the display device 110 judges whether the event occurs or not (st116).

For example, the monitoring part 150 of the timing controlling unit 120 of the display device 110 may judge whether the event occurs or not by detecting a change of the event signal Eve at the falling timing of the monitoring signal Mon.

As a result of the judgement, when the event does not occur (no), i.e., a change of the event signal Eve is not detected at the falling timing of the monitoring signal Mon, the display device 110 monitors the event again (st112).

The frequency modulating part 152 of the timing controlling unit 120 of the display device 110 maintains the determined frequency of about 1 Hz to about 10 Hz without a modulation and outputs a blank signal B1*a* corresponding to the low frequency.

As a result of the judgement, when the event occurs (yes), i.e., a change of the event signal Eve is detected at the falling timing of the monitoring signal Mon, the display device 110 increases the frequency (stl18).

For example, the monitoring part 150 of the timing controlling unit 120 of the display device 110 may detect the change of the event signal Eve at a second timing TM2 which is a falling timing of the monitoring signal Mon after the first timing TM1 where the event occurs and may transmit the detection result to the frequency modulating part 152 of the timing controlling unit 120 of the display device 110. The frequency modulating part 152 may increase the determined low frequency of about 1 Hz to about 10 Hz to the high frequency of about 120 Hz to output the blank signal B1*a* corresponding to the high frequency. However, the present disclosure is not limited to it. For example, the frequency modulating part 152 may increase the determined low frequency of about 1 Hz to about 10 Hz to the high frequency of 24 Hz, 60 Hz or 90 Hz, and output a blank signal B1*a* corresponding to the high frequency. In another aspect, the high frequency may be 60 Hz to 120 Hz.

The data signal Vdata of a low gray level voltage Vlg corresponding to the low gray level may be changed to the data signal Vdata of a high gray level voltage Vhg corresponding to the high gray level, and the high frequency may be applied to an (n+1)th frame F(n+1) of a next frame after the end of an nth frame F(n) of a present frame. However, the present disclosure is not limited to it. For example, the high frequency may be applied to an (n+2)th frame F(n+2) or (n+3)th frame F(n+3).

Next, the display device 110 maintains the increased frequency and then decreases the frequency (st120).

For example, the frequency modulating part 152 of the timing controlling unit 120 of the display device 110 may maintain the high frequency of about 120 Hz for one frame and then may decrease the frequency to the low frequency of about 1 Hz to about 10 Hz at a fourth timing TM4 where the (n+1)th frame is ended to output the blank signal B1*a* corresponding to the low frequency. However, the present disclosure is not limited to it. For example, in the case where the event occurs continuously, the frequency modulating part 152 of the timing controlling unit 120 of the display device 110 may maintain the high frequency of about 120 Hz for two or more frames until the event does not occur any more.

As a result, the blank signal B1*a* may be changed from the logic high voltage Vh to the logic low voltage V1 at a third timing TM3 between the nth and (n+1)th frames F(n) and F(n+1) and may have a plurality of pulses corresponding to the high frequency of about 120 Hz till the fourth timing TM4 where the (n+1)th frame F(n+1) is ended.

The blank signal B1*a* has the logic high voltage Vh corresponding to a blank period where the data signal Vdata is not inputted and the logic low voltage V1 where the data signal Vdata is inputted. The blank signal B1*a* may have the logic low voltage V1 during the refresh subframe where the data signal Vdata is inputted and the logic high voltage Vh during the blank period between the subframes and the anode reset subframe where the data signal Vdata is not inputted.

In the operation of the low frequency of about 1 Hz of FIG. 8A, the blank signal B1*a* has the logic low voltage V1 and the data signal Vdata is inputted during the 1st subframe SF1 of the one refresh subframe SFrf of the nth frame F(n), and the blank signal B1*a* has the logic high voltage Vh and the data signal Vdata is not inputted during the blank period between the subframes and the 2nd to 120th subframes SF2 to SF120 of the 119 anode reset subframes SFar.

In the operation of the high frequency of about 120 Hz of FIG. 8B, the blank signal B1*a* has the logic low voltage V1 and the data signal Vdata is inputted during the 1st to 120th SF1 to SF120 of the 120 refresh subframes SFrf of the (n+1)th frame F(n+1), and the blank signal B1*a* has the logic high voltage Vh and the data signal Vdata is not inputted during the blank period between the subframes.

In the refresh subframe SFrf of the display device according to an aspect of the present disclosure of FIG. 9A, during a first period TP1, the emission signal Em, the gate1 signal Sc1, the odd gate2 signal Sc2*o* and the even gate2 signal Sc2*e* of each of the first to fourth subpixels SP1 to SP4 have the logic high voltage Vh, and the gate3 signal Sc3 and the gate4 signal Sc4 of each of the first to fourth subpixels SP1 to SP4 have the logic low voltage V1.

As a result, the first, third, seventh and eighth transistors T1, T3, T7 and T8 of each of the first to fourth subpixels SP1 to SP4 are turned on, and the second, fourth, fifth and sixth transistors T2, T4, T5 and T6 of each of the first to fourth subpixels SP1 to SP4 are turned off. Accordingly, the stress voltage Vobs is applied to the first, third and second nodes N1, N3 and N2 through the eighth, first and third transistors T8, T1 and T3, and the anode reset voltage Var is applied to the fourth node N4 through the seventh transistor T7.

During the first period TP1, the first to fourth nodes N1 to N4 are reset such that a hysteresis phenomenon due to the previous frame is prevented.

During a second period TP2, the emission signal Em, the odd gate2 signal Sc2*o*, the even gate2 signal Sc2*e*, the gate3 signal Sc3 and the gate4 signal Sc4 of each of the first to fourth subpixels SP1 to SP4 have the logic high voltage Vh, and the gate1 signal Sc1 of each of the first to fourth subpixels SP1 to SP4 has the logic low voltage V1.

As a result, the fourth transistor T4 of each of the first to fourth subpixels SP1 to SP4 is turned on, and the first, second, third, fifth, sixth, seventh and eighth transistors T1, T2, T3, T5, T6, T7 and T8 of each of the first to fourth subpixels SP1 to SP4 are turned off. Accordingly, the initial voltage Vini is applied to the second node N2 through the fourth transistor T4.

During the second period TP2, the second node N2 is reset to be initialized.

During a third period TP3, the emission signal Em, the first gate1 signal Sc1, the odd gate2 signal Sc2*o*, the even gate2 signal Sc2*e*, the gate3 signal Sc3 and the gate4 signal Sc4 of each of the first to fourth subpixels SP1 to SP4 have the logic high voltage Vh.

As a result, the first, third and fourth transistors T1, T3 and T4 of each of the first to fourth subpixels SP1 to SP4 are turned on, and the second, fifth, sixth, seventh and eighth transistors T2, T5, T6, T7 and T8 of each of the first to fourth subpixels SP1 to SP4 are turned off. Accordingly, the initial voltage Vini is applied to the second, third and first nodes N2, N3 and N1 through the fourth, third and first transistors T4, T3 and T1.

During the third period TP3, the second, third and first nodes N2, N3 and N1 are reset to be initialized.

During a fourth period TP4, the emission signal Em, the first gate1 signal Sc1, the even gate2 signal Sc2*e* and the gate3 signal Sc3 of each of the first to fourth subpixels SP1 to SP4 have the logic high voltage Vh, and the odd gate2 signal Sc2*o* and the gate4 signal Sc4 have the logic low voltage V1.

As a result, the first, second and third transistors T1, T2 and T3 of each of the first to fourth subpixels SP1 to SP4 are turned on, and the fourth, fifth, sixth, seventh and eighth transistors T4, T5, T6, T7 and T8 of each of the first to fourth subpixels SP1 to SP4 are turned off. Accordingly, the data signal Vdata is applied to the second node N2 through the second, first and third transistors T2, T1 and T3.

During the fourth period TP4, the data signal Vdata is applied to the second node N2 such that a sum (Vdata+Vth) of the data signal Vdata and the threshold voltage Vth of the first transistor T1 is applied to the gate electrode of the first transistor T1 and is stored in the storage capacitor Cs.

During a fifth period TP5, the emission signal Em, the first gate1 signal Sc1, the odd gate2 signal Sc2*o* and the gate3 signal Sc3 of each of the first to fourth subpixels SP1 to SP4 have the logic high voltage Vh, and the even gate2 signal Sc2*e* and the gate4 signal Sc4 have the logic low voltage V1.

As a result, the first, second and third transistors T1, T2 and T3 of each of the first to fourth subpixels SP1 to SP4 are turned on, and the fourth, fifth, sixth, seventh and eighth transistors T4, T5, T6, T7 and T8 of each of the first to fourth subpixels SP1 to SP4 are turned off. Accordingly, the data signal Vdata is applied to the second node N2 through the second, first and third transistors T2, T1 and T3.

During the fifth period TP5, the data signal Vdata is applied to the second node N2 such that a sum (Vdata+Vth) of the data signal Vdata and the threshold voltage Vth of the first transistor T1 is applied to the gate electrode of the first transistor T1 and is stored in the storage capacitor Cs.

During a sixth period TP6, the emission signal Em, the odd gate2 signal Sc2*o* and the even gate2 signal Sc2*e* of each of the first to fourth subpixels SP1 to SP4 have the logic high voltage Vh, and the gate1 signal Sc1, the gate3 signal Sc3 and the gate4 signal Sc4 have the logic low voltage V1.

As a result, the first, seventh and eighth transistors T1, T7 and T8 of each of the first to fourth subpixels SP1 to SP4 are turned on, and the second, third, fourth, fifth and sixth transistors T2, T3, T4, T5 and T6 of each of the first to fourth subpixels SP1 to SP4 are turned off. Accordingly, the stress voltage Vobs is applied to the first and third nodes N1 and N3 through the eighth and first transistors T8 and T1, and the anode reset voltage Var is applied to the fourth node N4 through the seventh transistor T7.

During the sixth period TP6, the first, third and fourth nodes N1, N3 and N4 are reset such that a hysteresis phenomenon due to the previous frame is prevented.

During a seventh period TP7 of an emission period, the odd gate2 signal Sc2*o*, the even gate2 signal Sc2*e* and the gate3 signal Sc3 of each of the first to fourth subpixels SP1 to SP4 have the logic high voltage Vh, and the emission signal Em, the gate1 signal Sc1 and the gate4 signal Sc4 have the logic low voltage V1.

As a result, the first, third, fifth and sixth transistors T1, T3, T5 and T6 of each of the first to fourth subpixels SP1 to SP4 are turned on, and the second, third, fourth, seventh and eighth transistors T2, T3, T4, T7 and T8 of each of the first to fourth subpixels SP1 to SP4 are turned off. Accordingly, the high level voltage Vdd is applied to the fourth node N4 through the fifth, first and sixth transistors T5, T1 and T6. Here, the threshold voltage is compensated and a current corresponding to the data signal Vdata flows in the first transistor T1 turned on.

During the seventh period TP7, the light emitting diode De emits a light corresponding to the data signal Vdata of the present frame.

In the anode reset subframe SFar of the display device according to an aspect of the present disclosure of FIG. 9B, during an eighth period TP8 of an emission period, the odd gate2 signal Sc2*o*, the even gate2 signal Sc2*e* and the gate3 signal Sc3 of each of the first to fourth subpixels SP1 to SP4 have the logic high voltage Vh, and the emission signal Em, the gate1 signal Sc1 and the gate4 signal Sc4 of each of the first to fourth subpixels SP1 to SP4 have the logic low voltage V1.

As a result, the first, fifth and sixth transistors T1, T5 and T6 of each of the first to fourth subpixels SP1 to SP4 are turned on, and the second, third, fourth, seventh and eighth transistors T2, T3, T4, T7 and T8 of each of the first to fourth subpixels SP1 to SP4 are turned off. Accordingly, the high level voltage Vdd is applied to the fourth node N4 through the fifth, first and sixth transistors T5, T1 and T6. Here, the threshold voltage is compensated and a current corresponding to the data signal Vdata flows in the first transistor T1 turned on.

During the eighth period TP8, the light emitting diode De emits a light corresponding to the data signal Vdata of the refresh subframe SFrf.

During a ninth period TP9, the emission signal Em, the odd gate2 signal Sc2*o* and the even gate2 signal Sc2*e* of each of the first to fourth subpixels SP1 to SP4 have the logic high voltage Vh, and the gate1 signal Sc1, the gate3 signal Sc3 and the gate4 signal Sc4 of each of the first to fourth subpixels SP1 to SP4 have the logic low voltage V1.

As a result, the first, seventh and eighth transistors T1, T7 and T8 of each of the first to fourth subpixels SP1 to SP4 are turned on, and the second, third, fourth, fifth and sixth transistors T2, T3, T4, T5 and T6 of each of the first to fourth subpixels SP1 to SP4 are turned off. Accordingly, the stress voltage Vobs is applied to the first and third nodes N1 and N3 through the eighth and first transistors T8 and T1, and the anode reset voltage Var is applied to the fourth node N4 through the seventh transistor T7.

During the ninth period TP9, the first, third and fourth nodes N1, N3 and N4 are reset such that a hysteresis phenomenon due to the previous timing is prevented.

Next, referring again to FIGS. 5 to 7, the display device 110 judges whether an additional event occurs or not (sti22).

For example, the monitoring part 150 of the timing controlling unit 120 of the display device 110 may judge whether the additional event occurs or not by detecting a change of the event signal Eve at the falling timing of the monitoring signal Mon.

As a result of the judgement, when the additional event does not occur (no), i.e., a change of the event signal Eve is not detected at the falling timing of the monitoring signal Mon, the display device 110 monitors the event again (st112).

The timing controlling unit 120 of the display device 110 maintains the low frequency of about 1 Hz to about 10 Hz without a modulation.

As a result of the judgement, when the additional event occurs (yes), i.e., a change of the event signal Eve is detected at the falling timing of the monitoring signal Mon after the occurrence of the additional event, the display device 110 increases the frequency (st124).

For example, the monitoring part 150 of the timing controlling unit 120 of the display device 110 may detect the change of the event signal Eve at the falling timing of the monitoring signal Mon after the timing where the additional event occurs and may transmit the detection result to the frequency modulating part 152 of the timing controlling unit 120 of the display device 110. The frequency modulating part 152 may increase the low frequency of about 1 Hz to about 10 Hz to the high frequency of about 120 Hz to output the blank signal B1*a* corresponding to the high frequency.

Next, the display device 110 finishes the operation of the high speed mode of the high frequency (st126).

Here, the display device 110 may start the operation of the low speed mode of the low frequency or may finish the image display according to a user's selection by decreasing the frequency (st120) instead of finishing the operation of the high speed mode of the high frequency.

In the display device 110 according to an aspect of the present disclosure, when the event occurs at the first timing TM1 in the operation of the low frequency of about 1 Hz to about 10 Hz, the (n+1)th frame F (n+1) directly after the nth frame F (n) operates with the high frequency of about 120 Hz by increasing the frequency, and the (n+2)th frame F (n+2) directly after the (n+1)th frame F (n+1) operates with the low frequency of about 1 Hz to about 10 Hz by decreasing the frequency.

When the event occurs in the present frame of the low speed mode of the low frequency, the high frequency period is inserted into the next frame and a time to reach the target luminance is reduced. As a result, the response property is improved, and deterioration such as a flicker or a motion blur is reduced or minimized, thereby the display quality improved.

Further, since another next frame after the next frame operates again in the low speed mode of the low frequency by decreasing the frequency, the power consumption is reduced.

The improvement of the response property of the display device 110 will be illustrated with reference to a drawing.

Figure 10:
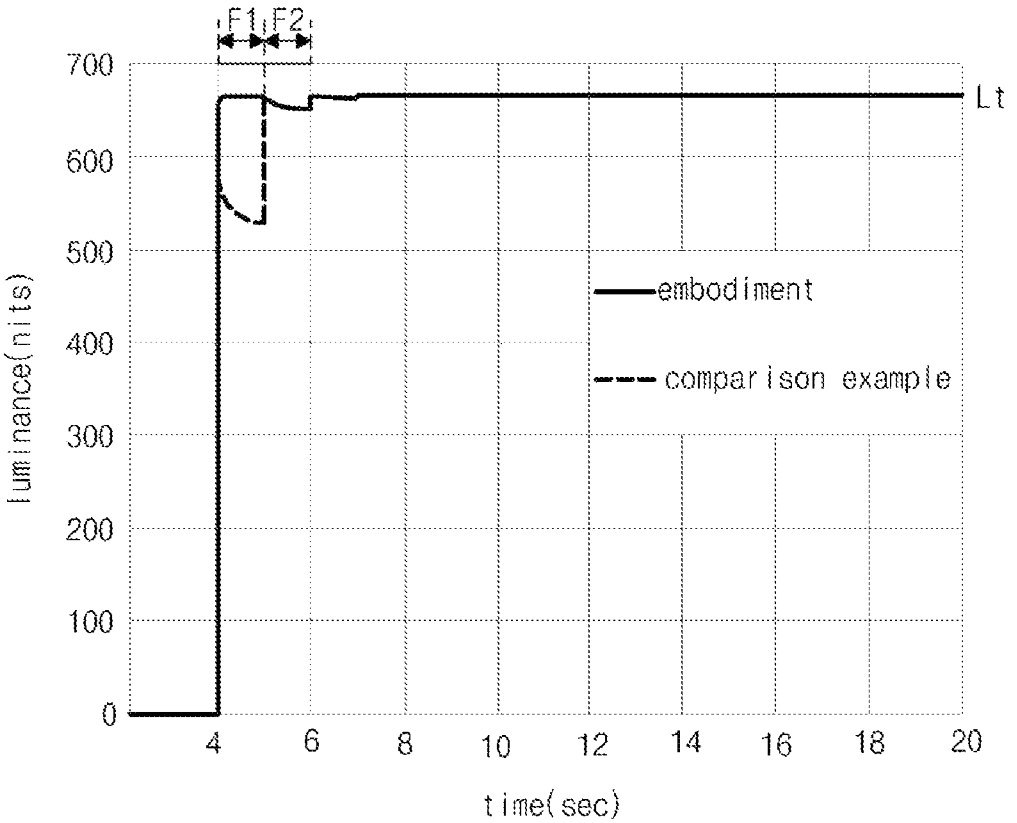
FIG. 10 is a view showing a multi-frame response property of a display device according to an aspect of the present disclosure.

FIG. 10 is a view showing a multi-frame response property of a display device according to an aspect of the present disclosure.

In a display device according to a comparison example of FIG. 10, a high frequency period is not inserted when an event occurs and a gray level is drastically changed due to the event. During a first frame F1, the display device according to a comparison example operates with a low frequency and a luminance of the display device according to a comparison example does not reach a target luminance Lt. During a second frame F2, the display device according to a comparison example reaches the target luminance Lt.

In the display device 110 according to an aspect of the present disclosure of FIG. 10, a high frequency period is inserted when an event occurs and a gray level is drastically changed due to the event. During a first frame F1, the display device 110 according to an aspect of the present disclosure operates with a high frequency and a luminance of the display device 110 according to an aspect of the present disclosure reaches a target luminance Lt. As a result, a time to reach the target luminance is reduced, and a response property is improved. Further, deterioration such as a flicker or a motion blur is reduced, and a display quality is improved.

In an aspect of FIGS. 1 to 7, a displayed image of a low gray level such as a black pattern is changed to a displayed image of a high gray level such as a white pattern when an event occurs. In another aspect, a displayed image of a high gray level such as a white pattern may be changed to a displayed image of a low gray level such as a black pattern when an event occurs. In another aspect, a response property is improved by inserting a high frequency period into the next frame after occurrence of the event, and a power consumption is reduced by decreasing a frequency in another next frame after the next frame.

Consequently, in a display device according to an aspect of the present disclosure, since a high frequency period is inserted when an event occurs in an operation of a low frequency mode, a response property is improved and a display quality is improved.

Further, since a high frequency period is inserted when an event occurs in an operation of a low frequency mode and the display device according to an aspect of the present disclosure returns to an operation of a low frequency again when an additional event does not occur, a response property is improved, a display quality is improved, and a power consumption is reduced.

It will be apparent to those skilled in the art that various modifications and variation may be made in the present disclosure without departing from the scope of the disclosure. Thus, it is intended that the present disclosure cover the modifications and variations of this disclosure provided they come within the scope of the appended claims and their equivalents.

What is claimed is:

1. A display device, comprising:

a timing controlling unit configured to generate an image data, a data control signal and a gate control signal;

a data driving unit configured to generate a data signal using the image data and the data control signal;

a gate driving unit configured to generate a gate signal using the gate control signal; and a display panel configured to display an image using the data signal and the gate signal, wherein the timing controlling unit includes a frequency modulating part configured to increase a frequency of the data signal when an event to the display panel occurs and decrease the frequency after a predetermined interval, and wherein a present frame of a first frequency when the event occurs includes a refresh subframe where the data signal is inputted and an anode reset subframe where an input of the data signal is stopped, a next frame of a second frequency higher than the first frequency after the present frame includes the refresh subframe without the anode reset subframe, and another next frame of the first frequency after the next frame includes the refresh subframe and the anode reset subframe.

2. The display device of claim 1, wherein the timing controlling unit further includes a monitoring part judging whether the event occurs or not.

3. The display device of claim 1, wherein the event includes a touch input, a physical button input and an unlock input to the display panel.

4. The display device of claim 1, wherein a gray level of the image data is changed when the event occurs.

5. The display device of claim 1, wherein the frequency modulating part increases the first frequency of 1 Hz to 10 Hz of the present frame when the event occurs to the second frequency of 120 Hz in the next frame after the present frame and decreases the second frequency of 120 Hz of the next frame to the first frequency of 1 Hz to 10 Hz in the another next frame after the next frame.

6. The display device of claim 1, wherein the display panel displays the image in a plurality of frames.

7. The display device of claim 1, wherein the gate signal includes a gate1 signal, an odd gate2 signal, an even gate2 signal, a gate3 signal, a gate4 signal and an emission signal, wherein the display panel includes a plurality of subpixels, and wherein each of the plurality of subpixels comprises:

a storage capacitor connected to a high level voltage;

a first transistor switched according to a voltage of a first capacitor electrode of the storage capacitor;

a second transistor switched according to one of the odd gate2 signal and the even gate2 signal and connected to the data signal and the first transistor;

a third transistor switched according to the gate1 signal and connected to the storage capacitor and the first transistor;

a fourth transistor switched according to the gate4 signal and connected to the storage capacitor and an initial voltage;

a fifth transistor switched according to the emission signal and connected to the high level voltage and the first transistor;

a sixth transistor switched according to the emission signal and connected to the first transistor;

a seventh transistor switched according to the gate3 signal and connected to an anode reset voltage and the sixth transistor;

an eighth transistor switched according to the gate3 signal and connected to a stress voltage and the first transistor; and a light emitting diode connected between the sixth transistor and a low level voltage.

8. The display device of claim 7, wherein at least one of the first to eighth transistors is an oxide semiconductor thin film transistor.

9. The display device of claim 1, wherein the gate signal includes a gate1 signal, an odd gate2 signal, an even gate2 signal, a gate3 signal, a gate4 signal and an emission signal, wherein the gate driving unit includes first and second gate driving units disposed at both sides of the display panel, wherein the first gate driving unit includes a gate1 signal block generating the gate1 signal, an odd gate2 signal block generating the odd gate2 signal, an even gate2 signal block generating the even gate2 signal and a gate3 signal block generating the gate3 signal, and wherein the second gate driving unit includes an odd gate2 signal block generating the odd gate2 signal, an even gate2 signal block generating the even gate2 signal, a gate4 signal block generating the gate4 signal and an emission signal block generating the emission signal.

10. The display device of claim 9, wherein the gate1 signal block is disposed farther from the display panel than the gate3 signal block, or the gate3 signal block is disposed farther from the display panel than the gate1 signal block, and wherein the gate4 signal block is disposed farther from the display panel than the emission signal block, or the emission signal block is disposed farther from the display panel than the gate4 signal block.

11. A method of driving a display device, comprising:

generating an image data, a data control signal and a gate control signal by a timing controlling unit;

generating a data signal using the image data and the data control signal by a data driving unit;

generating a gate signal using the gate control signal by a gate driving unit;

displaying an image using the data signal and the gate signal by a display panel;

increasing a frequency of the data signal when an event to the display panel occurs by the timing controlling unit; and decreasing the frequency after a predetermined interval by the timing controlling unit, wherein a present frame of a first frequency when the event occurs includes a refresh subframe where the data signal is inputted and an anode reset subframe where an input of the data signal is stopped, a next frame of a second frequency higher than the first frequency after the present frame includes the refresh subframe without the anode reset subframe, and another next frame of the first frequency after the next frame includes the refresh subframe and the anode reset subframe.

12. The method of claim 11, further comprising:

monitoring an event signal corresponding to the event according to a monitoring signal by the timing controlling unit; and judging whether the event occurs or not from the event signal by the timing controlling unit.

13. The method of claim 11, further comprising increasing the frequency when an additional event to the display panel occurs by the timing controlling unit.

14. The method of claim 11, wherein a gray level of the image data is changed when the event occurs.

15. A method of driving a display device, comprising:

detecting a change of an event signal corresponding to an event by a monitoring part;

displaying an image data by a display panel at a first frequency;

displaying the image data by the display panel at a second frequency during a predetermined time period after a current frame in which the event signal changes, if a change of the event signal is detected; and displaying the image data by the display panel at the first frequency, after the predetermined time period, wherein a present frame of the first frequency when the event occurs includes a refresh subframe where the data signal is inputted and an anode reset subframe where an input of the data signal is stopped, a next frame of the second frequency higher than the first frequency after the present frame includes the refresh subframe without the anode reset subframe, and another next frame of the first frequency after the next frame includes the refresh subframe and the anode reset subframe.

16. The method of claim 15, wherein generating a data signal having the first frequency using the image data by a data driving unit when the image data is displayed at the first frequency, and wherein generating a data signal having the second frequency using the image data by the data driving unit when the image data is displayed at the second frequency.

17. The method of claim 15, wherein when an event occurs, a corresponding event signal changes from a logic high voltage to a logic low voltage or changes from the logic low voltage to the logic high voltage.

18. The method of claim 15, wherein the predetermined time period corresponding to at least one frame periods at first frequency.

19. The method of claim 15, wherein the first frequency is 1 Hz to 10 Hz, and the second frequency is 60 Hz to 120 Hz.

20. The display device of claim 1, wherein the frequency modulating part is configured to output a blank signal corresponding to one of the first and second frequencies, and wherein the blank signal has:

a logic low voltage during the refresh subframe of each of the present frame and the another next frame and during the refresh subframe of the next frame; and a logic high voltage during a blank period between subframes and the anode reset subframe of each of the present frame and the another next frame and during the blank period of the next frame.

21. The display device of claim 7, wherein the refresh subframe is classified into first to seventh periods, and the anode reset subframe is classified into eighth and ninth periods.

* * * * *